United States Patent [19]

Ford

[11] Patent Number: 4,479,589

[45] Date of Patent: Oct. 30, 1984

[54] PLUNGER LOCK FOR MANUAL DISPENSING PUMP

[75] Inventor: John M. B. Ford, Lee's Summit, Mo.

[73] Assignee: Realex Corporation, Lee's Summit, Mo.

[21] Appl. No.: 385,803

[22] Filed: Jun. 7, 1982

[51] Int. Cl.³ .......................... B67D 5/32; F16K 35/00

[52] U.S. Cl. .................................... 222/153; 222/321; 222/384

[58] Field of Search ............... 222/321, 383, 384, 385, 222/341, 153; 215/218, 221, 225, 274, 275; 239/600, 333

[56] References Cited

U.S. PATENT DOCUMENTS

| | | | |
|---|---|---|---|
| 595,115 | 12/1897 | Banning | 222/384 X |
| 1,715,329 | 5/1929 | Prescott | 222/384 X |
| 2,892,572 | 6/1959 | Fredette et al. | 222/153 |
| 3,148,805 | 9/1964 | Corsette et al. | 222/321 X |
| 4,204,615 | 5/1980 | McCarthy | 222/153 |
| 4,369,899 | 1/1983 | Magers et al. | 222/321 X |
| 4,377,106 | 3/1983 | Workman et al. | 222/153 X |
| 4,384,660 | 5/1983 | Palmisano et al. | 222/384 X |

FOREIGN PATENT DOCUMENTS

| | | | |
|---|---|---|---|
| 2233318 | 1/1973 | Fed. Rep. of Germany | 215/221 |

*Primary Examiner*—Charles A. Marmor

*Attorney, Agent, or Firm*—Schmidt, Johnson, Hovey & Williams

[57] ABSTRACT

The plunger of the pump has an axial lock by which the plunger can be locked down in its fully depressed position during periods of non-use and a rotary lock for preventing inadvertent rotation of the plunger out of its locked down mode. The rotary lock includes a pair of yieldably spreadable arms which circle the collar of the pump and latch against one another in overlapping, embracing relationship so that the lock is held tightly on the collar against rotation relative thereto. A locking bar integral with the arms and of essentially rigid construction projects up out of the plane of curvature of the arms and has a saddle-like notch at its uppermost tip which complementally receives a portion of the spout associated with the discharge head of the plunger, thereby rendering the plunger rotatively immobile relative to the collar. If desired, hinge lines which permit the arms to flex toward and away from one another during installation and removal of the rotary lock from the pump may be intentionally designed to be in a sufficiently weakened condition as to permit at least one of the arms to be torn free from the remainder of the lock in order to release the latter from the pump. Mating teeth of optional configurations may be provided on the interior portions of the arms and the exterior of the pump collar to promote tight retention of the lock on the collar.

12 Claims, 9 Drawing Figures

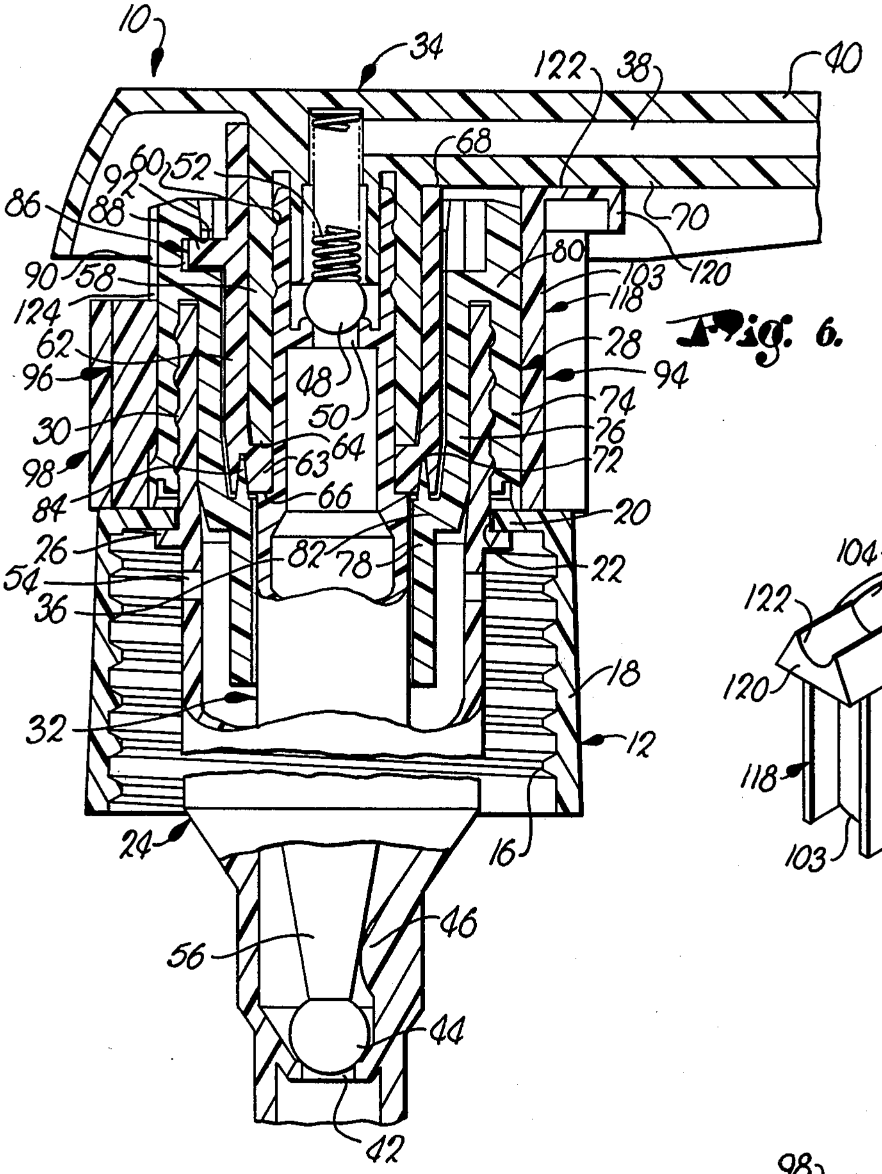
Fig. 6.
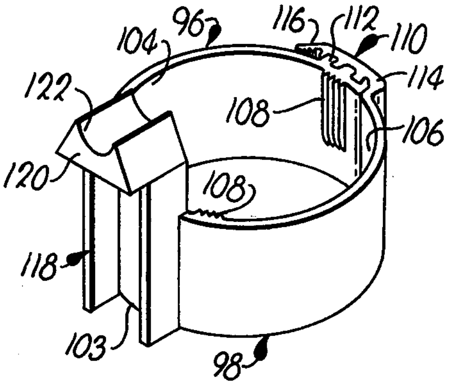
Fig. 3.
Fig. 7.
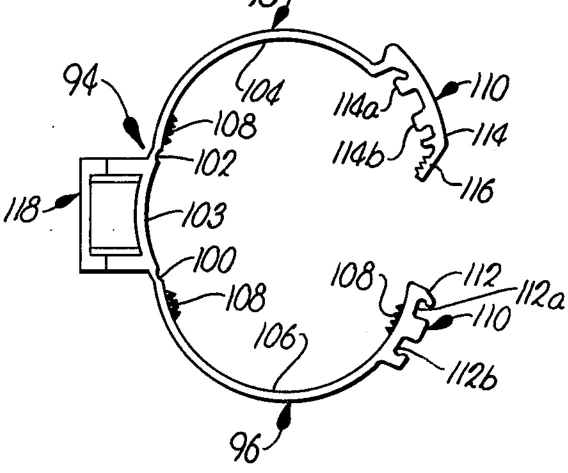
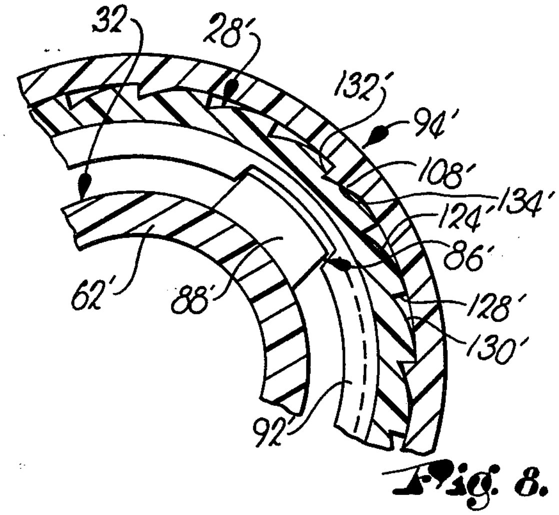
Fig. 8.

PLUNGER LOCK FOR MANUAL DISPENSING PUMP

TECHNICAL FIELD

This invention relates to the field of manually operated dispensing pumps of the type typically utilized to dispense liquid laundry detergents, hand soaps, and other consumer products. More particularly, it relates to improvements in locks for holding the plungers of such pumps in their fully depressed positions for shipment and otherwise.

BACKGROUND ART

A variety of structures have heretofore been employed as a means for locking down the plunger of a dispensing pump in a fully depressed position during periods of non-use. For example, co-pending application Ser. No. 06/207,892 filed Nov. 18, 1980, in the names of Magers, et al. and assigned to the assignee of the present invention, now U.S. Pat. No. 4,369,899, discloses a "bayonet" type lock down arrangement which has proven to be quite acceptable. The bayonet lock of the application is placed in its locking mode by depressing the plunger fully until locking lugs on the plunger are aligned with receiving notches in the collar through which the plunger reciprocates, whereupon the plunger is rotated slightly relative to the collar to slip the lugs underneath overhead shoulders or ledges of the collar. In this manner, axial movement of the plunger in either direction is precluded, so long as the plunger is not rotated out of its locked mode.

SUMMARY OF THE PRESENT INVENTION

One important object of the present invention is to provide an additional lock on the pump which is used to prevent inadvertent rotation and release of the locked down plunger out of its locking mode.

Pursuant to the foregoing, the present invention contemplates a unitary, integrally molded lock of suitable plastic composition having a pair of locking arms that are formed in outwardly arcuate, opposing relationship to each other so as to be slipped onto the pump to be locked in such a manner that they tightly embrace the collar of the pump. Overlapping portions of the arms adjacent their respective outer ends are configured to latchingly snap together so as to form a tight annulus about the collar and thereby prevent relative rotation between the lock and the collar. A locking bar projecting outwardly from the plane of curvature of the arms is essentially rigid and retainingly engages a portion of the laterally projecting spout of the plunger whereby to transmit the rotative immobility of the lock to the plunger itself. With the plunger locked down by the bayonet locking means or other suitable components against axial movement and then additionally locked against rotary movement that would otherwise provide for unlocking of the bayonet means, the plunger is rendered totally immobile.

BRIEF DESCRIPTION OF THE DRAWINGS

FIG. 3 is an enlarged, front perspective view of the rotary lock of the present invention;

FIG. 6 is an enlarged, fragmentary, vertical cross-sectional view through the pump with parts shown in elevation to reveal details of construction;

FIG. 7 is a bottom plan view of the rotary lock of FIG. 3 with the arms thereof spread apart to illustrate their inherent flexibility about hinge line joints thereof;

FIG. 8 is an enlarged, fragmentary, transverse cross-sectional view through a second form of the pump and rotary lock of the present invention in which specially formed, one-way, interengaging teeth are provided on the collar and the lock.

DETAILED DESCRIPTION

Figure 1:
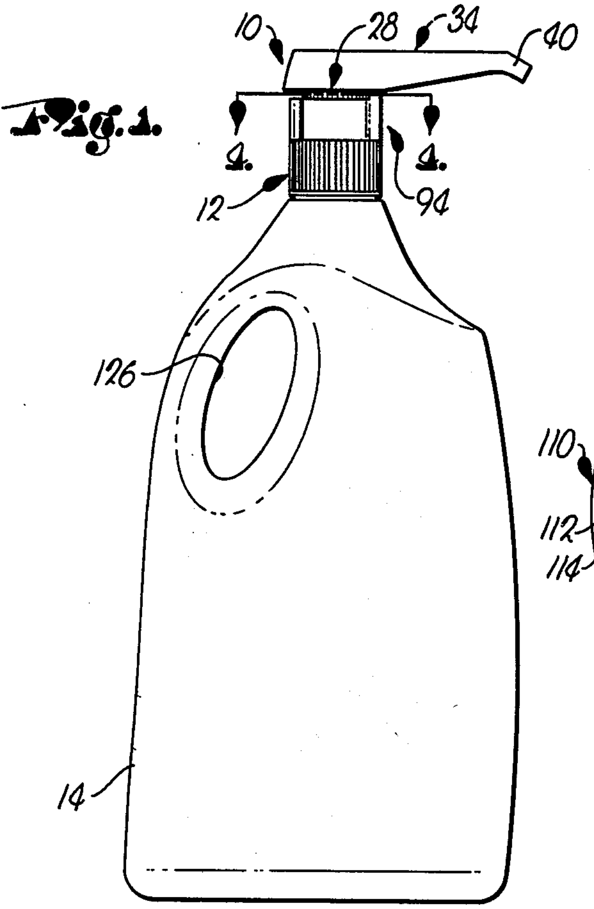
FIG. 1 is a side elevational view of a dispensing pump mounted on a typical, liquid product container and employing a rotary plunger lock in accordance with the principles of the present invention.

The pump 10 is installed upon the closure 12 of a container 14 having a threaded neck finish (not shown) which mates with internal threads 16 (FIG. 6) of the closure 12 formed on the annular sidewall 18 thereof. The top wall 20 of the closure 12 is provided with a centrally disposed opening 22 through which the upper portion of tubular body 24 of the pump 10 projects. An external, annular flange 26 on the body 24 rests upon the top edge of the neck finish in order to suspend the lower portion of the body 24 down into the interior of the container 14.

The pump 10 further includes an annular collar 28 snapped onto the upper end of the body 24 via parallel, interfitting beads and grooves denoted broadly by the numeral 30. The fit between beads and grooves 30 is such that the collar 28 may rotate about the upper end of the body 24 if sufficient torque is applied to the collar 28, it being noted that the collar 28 is not merely loosely held into the body 24, however. The collar 28 serves to attach pump 10 to the closure 12 such that the closure 12 and the pump 10 together form an assembly which can be threaded onto and off of the container 14 as desired. The lowermost annular edge of the collar 28 is segmented so as to present a series of outwardly yieldable skirt segments 29 separated by slits 29*a* (FIG. 2) which clamp tightly down against the top wall 20 of closure 12. The outward yieldability of the segments 29 permits top wall thicknesses of various dimensions to be accommodated as disclosed and claimed in co-pending application titled Size Compensating Collar in a Pump Dispenser, Ser. No. 06/207,891, filed Nov. 18, 1980 in the names of Foster, et al. and assigned to the assignee of the present invention, now U.S. Pat. No. 4,371,099.

The collar 28 is located in axial registration with the body 24 and functions to provide a bearing surface for the reciprocable plunger 32 of the pump 10 having an operating head 34 at its upper end which may be manually depressed and raised in order to reciprocate the plunger 32 and operate the pump 10. A piston seal (not shown) adjacent the lower end of the plunger 32 makes sealing contact with the interior surface of the body 24 for the purpose of pumping products into the body 24 below the seal during an upstroke of the plunger 32, and for pumping such products out of the body 24 via a passage 36 in the plunger 32 during a down stroke of the latter. From the passage 36, the products flow to an outlet 38 in the spout 40 of the head 34.

The pump 10 further includes an inlet 42 at the lower end of the body 24 communicating the interior of the container 14 with the interior of the body 24. Inlet 42 is controlled by a ball check valve 44 which seats against the inlet 42 to close the latter during a down stroke of the plunger 32 and which rises off the inlet 42 to open the latter during an upstroke of the plunger 32. Upward movement of the ball valve 44 is limited by a series of inwardly projecting nibs 46 on the body 24 a short distance above the ball 44. A second ball valve 48 is located within the passage 36 adjacent the upper end of the plunger 32 for controlling an outlet 50 that communicates the interior passage 36 with the outlet 38 of spout 40. Upper ball valve 48 is yieldably biased into a position closing the outlet 50 by a compression spring 52, the ball 48 closing the outlet 50 during an upstroke of the plunger 32 and opening the outlet 50 during a down stroke of the plunger 32. Vent holes 54 in the body 24 slightly below the flange 26 allow the ingress of ambient air into the container 14 from along the interface of the plunger 32 and the collar 28 for the purpose of equalizing pressure externally and internally of the container 14 during the upstroke of the plunger 32.

The plunger 32 is provided with a hollow lower end 56 for the purpose of holding down the ball check valve 44 at such time as the plunger 32 is in a fully depressed position as illustrated in FIG. 6. Suitable orifices (not shown) are provided in the lower end 56 for the purpose of allowing entry of products into the passage 36 of plunger 32 during the down stroke of the latter.

The plunger 32 is of reduced diameter adjacent its upper end and is securely received within a depending annular portion 58 of the head 34 at that location. Interfitting beads and grooves 60 permit the plunger 32 and the annular portion 58 to be snapped together in tight interengagement so that the head 34 and the plunger 32 effectively become a single unit without relative rotational movement therebetween. A sleeve 62 receives the depending annular portion 58 and has a radially inwardly disposed, annular section 63 at its lower end that is trapped between the lower end 64 of the annular head portion 58 and an upwardly facing ledge 66 formed at the initiation of the reduced diameter portion of the plunger 32 so that sleeve 62 effectively forms a part of and is carried with the plunger 32 during reciprocation of the latter. An indentation 68 in the top edge of the sleeve 62 receives the normally horizontally extending tubular section 70 of the spout 40 containing the internal outlet passage 38. Thus, the sleeve 62 and the head 34 are held by the indentation 68 and tubular section 70 against relative rotation. A downwardly opening annular groove 72 is formed in the bottom of the sleeve 62.

The collar 28 includes an outer cylinder 74, an intermediate cylinder 76 of reduced diameter with respect to the outer cylinder 74, and an inner cylinder 78 of still further reduced diameter. The intermediate cylinder 76 is recessed from the top of the outer cylinder 74 and is connected thereto by a series of three radially extending circumferentially spaced apart bridges 80, while the inner cylinder 78 is substantially further recessed and is integrally connected to the intermediate cylinder 76 at its lower end via a continuous, annular connection 82. The upper end of the body 24 projects securely between the outer cylinder 74 and the intermediate cylinder 76, and the sleeve 62 is received between the intermediate cylinder 76 and the depending annular portion 58 of the head 34. The fit between the sleeve 62 and the intermediate cylinder 76 is such that the head 34 and the sleeve 62 can rotate relative to the intermediate cylinder 76. In a similar way, the fit between the inner cylinder 78 and the plunger 32 is such that the latter can rotate freely relative to the cylinder 78, although the annular connection 82 between the intermediate cylinder 76 and the inner cylinder 78 is provided with an upwardly projecting, annular tongue 84 that is sealingly and matingly received within the groove 72 of sleeve 62 when the plunger 32 is in its fully depressed position.

Figure 5:
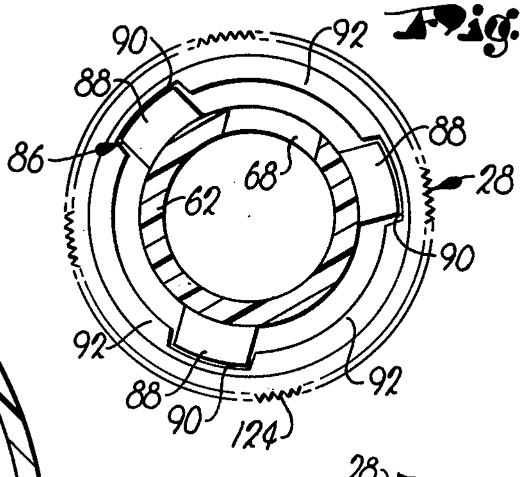
FIG. 5 is a view of the pump corresponding generally to FIG. 4 but with the bayonet lock thereof shown in an unlocked mode.

An axial lock of the "bayonet" type broadly denoted by the numeral 86 is provided between the plunger 32 and the collar 28 for the purpose of releasably retaining the plunger 32 in the down-and-locked position of FIGS. 1 and 6. Broadly stated, the lock 86 includes a series of three radially projecting lugs 88 on the sleeve 62 of the plunger 32, a corresponding set of three lug-receiving notches 90 in the collar 28, and a corresponding series of three retaining shoulders 92 interspersed between the receiving notches 90. The notches 90 open axially of the pump 10 so as to be in position to receive the lugs 88 when the latter are properly vertically registered therewith, and the shoulders 92 project radially inwardly beyond the radially outer terminations of the lugs 88. Accordingly, when the lugs 88 are inserted into the notches 90 as shown in FIG. 5 and the plunger 32 is then rotated in a clockwise direction, the lugs 88 come to underlie the shoulders 92 and prevent upward extension of the plunger 32. On the other hand, when the pump is in an unlocked mode, the lugs 88 overlie the shoulders 92 and thereby serve as stroke limiters upon depression of the plunger 32.

Although not illustrated herein, it is to be understood that each of the shoulders 92 is provided with a depending abutment located at the clockwise end of the shoulder 92 as viewed from the top. Each such abutment projects radially inwardly to the same extent as its corresponding shoulder 92 so as to be located in the path of travel of the corresponding lug 88 as the latter is shifted beneath the shoulder 92 during clockwise rotation of the plunger 32. The abutments thereby serve to limit such rotation of the plunger 32 in a clockwise direction when the pump 10 is in its locking mode.

Figure 4:
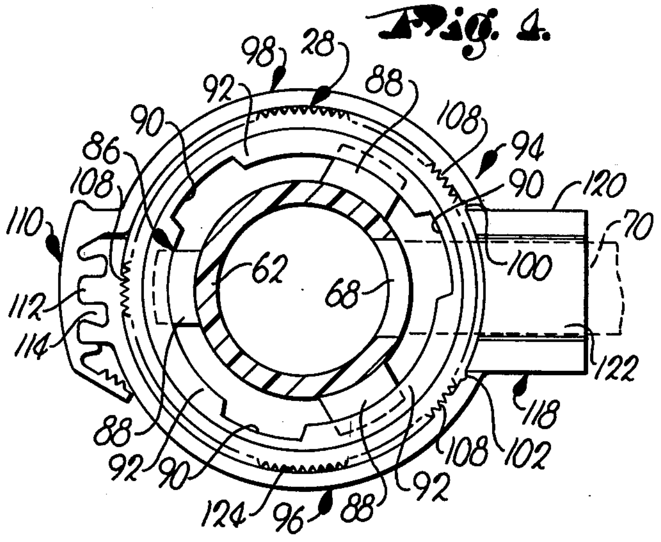
FIG. 4 is an enlarged, fragmentary, transverse cross-sectional view of the lock and associated components taken substantially along line 4—4 of FIG. 1.

The pump 10 is also provided with a rotary lock 94 for the plunger 32 for the purpose of holding the latter against unlocking rotation out of the down-and-locked position of FIG. 4. The lock 94 preferably comprises a single, unitary, integrally molded body of suitable plastic composition. A pair of outwardly arcuate, opposing arms 96 and 98 of the lock 94 are each constructed generally in the nature of flat straps or bands and are hingedly interconnected for yieldable movement toward and away from one another by transverse hinge lines of weakness 100 and 102 on opposite sides of a common central section 103. The respective interior surfaces 104 and 106 of arms 96 and 98 are provided with gripping portions in the nature of tooth-like protrusions 108 which extend transversely of the longitudinal axes of the arms 96 and 98, starting at the normally top marginal edge thereof and terminating before the opposite marginal edge thereof is reached. The smooth area of each surface 104 and 106 between the termination of the protrusions 108 and the lower marginal edge of the arms 96, 98 is at least as tall as the skirt segments 29 of collar 28. If desired, the protrusions 108 may be provided at only intermittent locations around the interior surfaces 104 and 106 as shown instead of continuously around the same.

The free, outer ends of the arms 96 and 98 are provided with mutually interengageable latch means 110 that includes overlapping structures 112 and 114 on the arms 96 and 98. Each of the structures 112, 114 comprises a series of grooves and ribs designed to matingly fit into or receive corresponding grooves or ribs in the opposite structure 112 or 114. Two of the ribs **114*a* and 114*b* on the structure 114 are enlarged at their outermost tip ends with respect to the entry mouths of corresponding receiving grooves 112*a* and 112*b* of the structure 112. Therefore, when the structures 112 and 114 are overlapped in the manner illustrated in FIG. 3 and a compressive force is applied by which the structures 112 and 114 are pressed toward one another, the ribs 114*a* and 114*b* are caused to snap sharply into the grooves 112*a* and 112*b* for positive retention. A finger-grippable pull tab 116 adjacent the structure 114 on arm 98 and at the outermost extremity of the latter is provided to assist in pulling the structures 112 and 114 apart when it is desired to release the latch means 110**.

The lock 94 further includes a projecting bar 118 which is integrally joined with the arms 96 and 98 between the hinge lines 100 and 102. The bar 118 is situated on the exterior of the arms 96 and 98 and projects upwardly out of the plane of curvature of the latter for a short distance where it is provided with an uppermost tip 120. The tip 120, while continuing in the axial direction of the bar 118, also juts transversely outwardly therefrom for a short distance as illustrated and is provided with an axially facing, arcuately concave notch 122 which is configured complementally of the arcuate exterior of the tubular portion or section 70 of discharge spout 40.

OPERATION

In use the rotary lock 94 is designed to be snapped onto the collar 28 of the pump 10 when the plunger 32 is in its down-and-locked condition, i.e. when the lugs 88 of the axial bayonet lock 86 have been slipped beneath the overhanging shoulders 92 of the collar 28. Inasmuch as the arms 96 and 98 can flex yieldably about their respective hinge lines 100 and 102, it is an easy matter to sufficiently spread the arms 96 and 98 that they can be readily slipped around the collar 28 into embracing relationship therewith as shown clearly in FIG. 4 for example. As the arms 96 and 98 are then flexed back toward one another, the structures 112 and 114 of latch means 110 come into overlapping engagement with one another and their ribs **114*a*, 114*b* and grooves 112*a*, 112*b* snap into tight retaining relationship as pressure is applied to the outside of the arm 98 at the structure 114. This also brings the protrusions 108 into gripping engagement with knurls 124 or the like along the exterior of the collar 28 above the segments 29. Consequently, the lock 94 becomes rotatively immobilized relative to the collar 28**.

Figure 2:
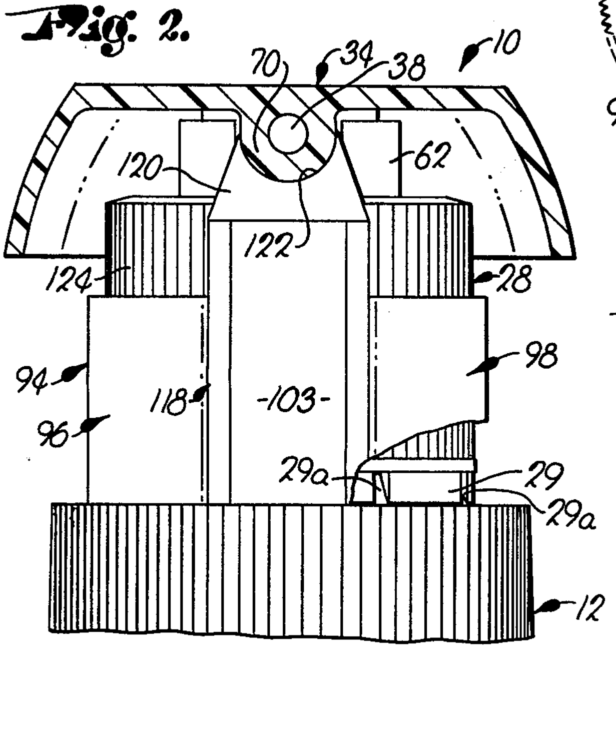
FIG. 2 is an enlarged, fragmentary, elevational view thereof with the dispensing head shown partially in vertical cross-section to reveal details of construction.

Coincidentally with placing the arms 96 and 98 about the collar 28, the locking bar 118 is aligned properly with the dispensing spout 40 such that the notch 122 in tip 120 snugly receives the tubular portion 70 of discharge spout 40 as illustrated in FIGS. 2 and 4 for example. Thus, the immobility of the arms 96 and 98 relative to the collar 28 is transmitted to the head 34 via the bar 118, thereby in turn making the plunger 32 itself also rotatively immobile relative to the collar 28. Hence, the plunger 32 cannot be rotated out of its locked down mode.

In this condition, the filled container 14 with the pump 10 attached thereto can be subjected to rather rough handling without fear that the plunger 32 will be accidentally unlocked, even in the event that the product is improperly grasped and handled by the spout 40 thereof instead of by other means such as the molded in handle 126 illustrated in FIG. 1.

When it is desired to remove the rotary lock 94 prior to use of the pump 10 to dispense the contents of container 14, it is but necessary for the user to simply grasp the pull tab 116 and unsnap the latch means 110, whereupon the lock 94 will be immediately released from the pump 10. Thereupon, a simple rotation of the plunger 32 in the appropriate direction unlocks the lugs 88 from beneath the shoulders 92 so that pumping strokes may take place to dispense the product.

Figure 9:
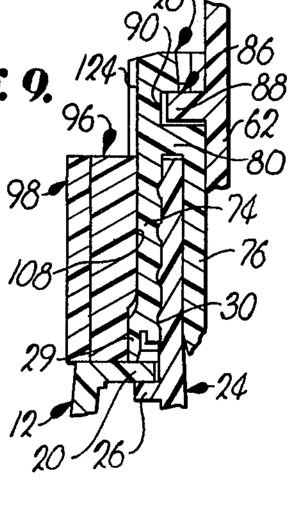
FIG. 9 is an enlarged, fragmentary vertical cross-sectional view of the locked-down pump illustrating in particular the way in which the rotary lock accommodates the special configuration of the lower portion of the pump collar.

It is important to note as shown particularly in FIGS. 2 and 9 that because the protrusions 108 are not full length across the width of the arms 96, 98, the protrusions 108 do not interfere with the segments 29 or their slight, outward yielding action. Likewise, the smooth segments 29 do not hold the protrusions 108 out away from meshing relationship with the knurls 124. Thus, the lock 94 tightly grips the collar 28. If desired, the hinge lines of weakness 100 and 102 for the arms 96 and 98 respectively may be sufficiently thin as to permit the remover of the lock 94 to pull back the arm 98 sufficiently by the tab 116 so as to tear the arm 98 from the rest of the lock 94. This, in some instances, may facilitate release and removal of the lock 94 from the pump 10.

FIG. 8 shows a slightly modified second embodiment of the invention. In this regard, the collar 28' is provided with specially configured external knurls 124' designed to permit one-way rotation of the modified lock 94' during initial installation thereof. In this respect, it will be noted that the special knurls 124' are each provided with generally radially outwardly extending surfaces 128' and with arcuate surfaces 130' intersecting surfaces 128' at the outer extremities thereof and sloping inwardly away therefrom.

Correspondingly, the protrusions 108' on the lock 94' each include an essentially radially extending surface 132' and a second surface 134' which intersects the radial surface 132' at its outermost extremity and slopes away therefrom. Thus, the surfaces 132' and 128' are designed to abuttingly interlock when the lock 94' is clasped about the collar 28', thereby permitting rotation of the lock 94' in a clockwise direction viewing FIG. 8 but precluding such rotation in a counterclockwise direction viewing FIG. 8.

This may be of significance during installation of the lock 94' at which time it may be convenient to rotate the plunger 32' into its locking mode with the lugs 88' beneath the shoulders 92' after the rotary lock 94' has been tightened onto the collar 28'. While such rotation in a clockwise direction to engage the lugs 88' beneath the shoulders 92' would be permitted as the protrusions 108' of lock 94' slipped along the arcuate sloping surfaces 124' of collar 28', retrograde unlocking rotation thereof in a manner to thereafter move the lugs 88' out from under the shoulders 92' would not be permitted because of blocking interengagement of the surfaces 128' and 132'.

I claim:

1. In a manually operated dispensing pump having a plunger reciprocable through a collar of the pump and normally rotatable about the longitudinal axis of the plunger, locking means for the plunger comprising:

an axial lock for releasably retaining the plunger in a depressed position against said reciprocal pumping movement, said axial lock having components disposed to become disengaged from one another upon unlocking rotation of the plunger relative to the collar in a certain rotative direction when the plunger is in said depressed and locked position; and a releasable rotary lock between the collar and the plunger for holding the plunger against said unlocking rotation thereof, said lock including a pair of arms integrally interconnected at one end thereof and having interengageable latch means at the opposite ends thereof, said arms being yieldably separable prior to engaging said latch means whereby to facilitate installation on and around said collar, said lock further including a projection extending axially from said arms at said one end thereof in disposition for engaging a proximal portion of said plunger, said collar being provided with a series of elongated knurls on the outer peripheral surface thereof extending axially with respect to the direction of plunger operation and with an unknurled, axially segmented, normally lower marginal edge portion, said arms each having elongated, axially extending protrusions on the inner peripheral surface thereof, said protrusions being only in that area of the arms disposed to engage said knurls, the area of the arms disposed to engage said segments of the collar being devoid of protrusions.

2. An anti-rotation lock for the rotatable plunger of a manually operable dispensing pump wherein the plunger is reciprocable through an annular collar of the pump during pumping strokes, said lock comprising:

a pair of outwardly arcuate, opposing arms integrally interconnected at one end thereof and yieldably movable toward and away from one another about said interconnection for embracing said collar when the lock is installed on the pump;

interengageable latch means at the outer ends of said arms for retaining the same in a closed annulus when said latch means is engaged, said arms having interior portions thereof adapted to bear tightly against said collar when the lock is installed and the latch means engaged whereby to prevent relative rotation between the lock and the collar; and an essentially rigid bar integrally joined with said arms and projecting out of the plane of curvature thereof for locking engagement with the plunger of the pump when the lock is installed thereon whereby to transmit the rotative immobility of the arms to the plunger.

3. An anti-rotation lock as claimed in claim 2, wherein said bar is provided with a tip remote from said arms having a receiving notch therein for a portion of the plunger.

4. An anti-rotation lock as claimed in claim 3, wherein said notch is arcuately concave and opens in the axial direction of said bar.

5. An anti-rotation lock as claimed in claim 2, wherein said arms are interconnected to each other through independent, yieldable connections with said bar on opposite sides of the latter.

6. An anti-rotation lock as claimed in claim 2, wherein said latch means includes a pull tab for selectively releasing the same.

7. An anti-rotation lock as claimed in claim 2, wherein said latch means includes overlapping structure on opposite ones of said arms, said structure being configured and arranged to snap into mutually retaining interengagement upon the application of sufficient compressive force thereto when aligned and in said overlapping relationship.

8. An anti-rotation lock as claimed in claim 7, wherein said latch means further includes a pull tab on one of said arms adjacent said structure to facilitate release of the structure from said retaining interengagement.

9. An anti-rotation lock as claimed in claim 2, wherein at least one of said arms is provided with a line of weakness at said interconnection whereby to permit the arm to be torn free from the remainder of the lock and thereby release the same.

10. An anti-rotation lock as claimed in claim 2, wherein said portions comprise toothed protrusions.

11. An anti-rotation lock as claimed in claim 10, wherein said bar projects outwardly beyond one marginal edge of the arms, said protrusions being spaced from an opposite marginal edge of the arms.

12. An anti-rotation lock as claimed in claim 2, wherein said portions comprise a series of protrusions configured to complementally mate with corresponding notches on said collar, said protrusions each including a first essentially radially extending surface and a second surface intersecting said first surface at the outer termination of the latter and sloping away from the same.

* * * * *